United States Patent [19]
Nielson

[11] 3,870,995
[45] Mar. 11, 1975

[54] ELECTRONIC COUNTERMEASURES SYSTEM

[75] Inventor: Robert L. Nielson, Ventura, Calif.

[73] Assignee: The United States of America as represented by the Secretary of the Navy, Washington, D.C.

[22] Filed: Feb. 25, 1971

[21] Appl. No.: 119,032

[52] U.S. Cl............................................. 343/18 E
[51] Int. Cl. ............................................. H04k 3/00
[58] Field of Search ................................. 343/18 E

[56] References Cited
UNITED STATES PATENTS

| | | | |
|---|---|---|---|
| 2,427,523 | 9/1947 | Dolberg et al. | 325/22 X |
| 2,862,203 | 11/1958 | Skaraeus et al. | 343/18 E |
| 2,885,543 | 5/1959 | Williams | 343/18 E |
| 3,039,092 | 6/1962 | Rychlik | 343/18 E |
| 3,365,718 | 1/1968 | Borg | 343/18 E |

Primary Examiner—Malcolm F. Hubler
Attorney, Agent, or Firm—Richard S. Sciascia; J. M. St. Amand; D. O'Reilly

[57] ABSTRACT

A system for preventing an ECM receiver employed to intercept enemy signals and to set a jamming transmitter to the same frequency from being subject to interference by its own jamming output. By blanking the jamming signal during the receiver CRT sweep interval, and negating every Nth blanking pulse, both the enemy's signals and the jamming signal are simultaneously displayed for monitoring, the former being visible through the latter so that any interruption or frequency shift in the enemy signal is readily detectable.

4 Claims, 3 Drawing Figures

ROBERT L. NIELSON
INVENTOR

ELECTRONIC COUNTERMEASURES SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When the operator of an ECM receiver turns on a jamming transmitter in order to confuse an enemy radar, the jamming signal appears on the screen of his monitor along with the signal from the radar being jammed. The strong jamming display completely obscures the enemy signal, and hence the receiver operator is prevented from knowing if any shift in such enemy signal should occur, or even if the enemy radar should go off the air. Although various expedients for correcting this condition have been proposed, it is still the practice for operators of ECM receivers periodically to shut down the jamming transmitter in order to be able to monitor the environment. This is obviously undesirable from the standpoint of maximum countermeasures efficiency.

SUMMARY OF THE INVENTION

By blanking the jamming transmitter in time correlation with the CRT sweep voltage, the jamming signal would be completely prevented from appearing on the CRT screen. However, by negating every Nth blanking pulse (depending on the strength of the jamming signal and/or the persistence of the screen phosphor) a jamming indication of lesser intensity is displayed through which the enemy signal is observable. This "look-through" technique allows concurrent monitoring of both signals without producing any appreciable reduction in system efficiency.

STATEMENT OF THE OBJECTS OF THE INVENTION

One object of the present invention, therefore, is to provide an improved system whereby the operator of an ECM receiver may concurrently monitor both enemy signals and one representative of his own jamming transmitter.

Another object of the present invention is to provide an improved form of "look-through" technique useful in a countermeasures environment.

A further object of the invention is to provide an ECM receiver with means for blanking the jamming transmitter during selected cathode-ray beam sweep intervals and only during such intervals.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
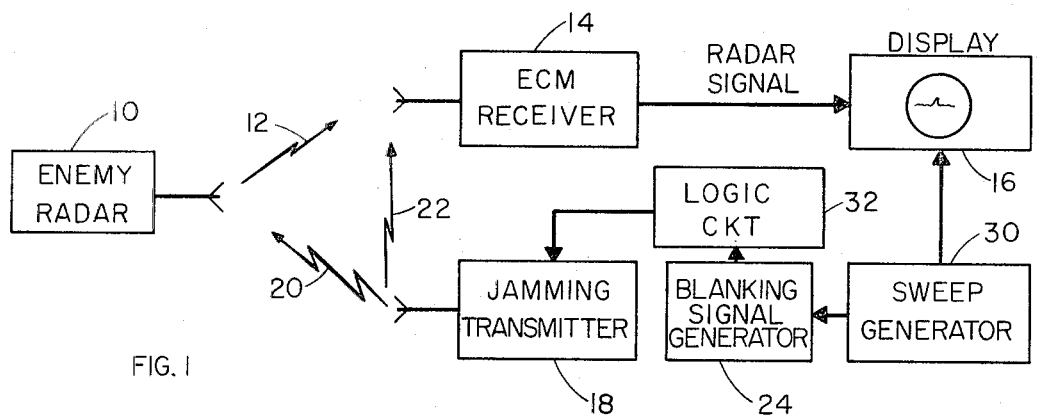
FIG. 1 is an electrical block diagram of a preferred form of countermeasures system designed in accordance with a preferred embodiment of the present invention.
Figure 3:
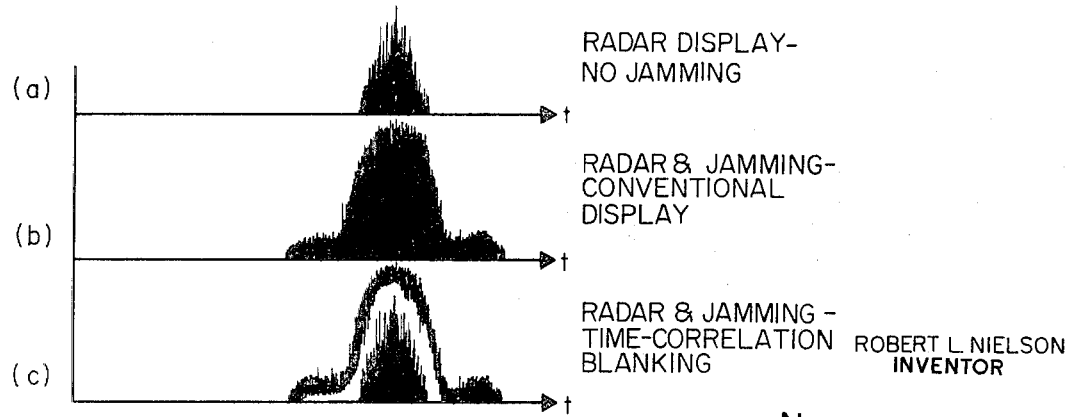
FIG. 3 is a set of indications such as might be presented on the display device of FIG. 1 under varying conditions of receiver operation.

In FIG. 1 of the drawings is illustrated a preferred system by means of which the operator of an ECM receiver may concurrently monitor both the signal from an enemy radar and one representative of the output of his own jamming transmitter. The enemy radar, identified by the reference numeral 10, sends out a signal represented by the symbol 12. This signal is picked up by an ECM receiver 14 of conventional design and presented in the usual fashion on the screen of a display device 16. One example of such a radar display is shown in FIG. 3(a).

Associated with the ECM receiver 14 is a jamming transmitter 18 designed to send out a signal 20 on the same frequency as that of the enemy radar 10, the purpose being to confuse the operator of radar 10 by obscuring any return which might provide useful information to the enemy. The frequency of the jamming transmitter 18 is thus chosen to coincide as closely as possible to the frequency of the radar to be so confused.

However, the output of the jamming transmitter 18 is also picked up by the receiver 14, as schematically indicated by the symbol 22. This strong signal appears on the display device 16 along with the signal 12 from radar 10, and is normally of such intensity as to completely obscure the radar signal of FIG. 3(a). This combined signal is thus conventionally presented as shown in FIG. 3(b), the radar signal being undetectable by the operator of receiver 14. The latter is thus prevented from knowing if any frequency shift in such radar signal should occur, or even if the enemy radar 10 should go off the air.

Figure 2:
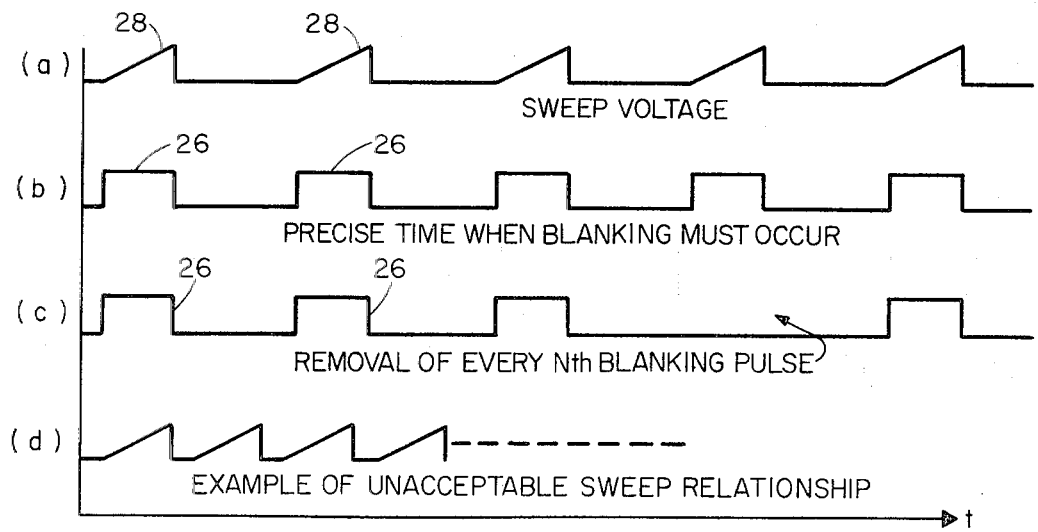
FIG. 2 is a set of waveforms useful in explaining the operation of the system of FIG. 1.

In accordance with the present invention, a blanking signal generator 24 is employed, this generator 24 producing a series of blanking pulses 26 (FIG. 2(b)) which are synchronized in time with the saw-tooth sweep voltage wave 28 representing the output of generator 30 and which deflects the cathode-ray beam of the display device 16. As shown in FIG. 2, the blanking pulses 26 occur in exact time coincidence with the saw-tooth voltage excursions 28.

A logic circuit 32 is arranged or programmed to remove or negate every Nth one of the blanking pulses 26, as shown in FIG. 2(c). The output of the logic circuit 32 is applied to blank the jamming transmitter 18 for the duration of each pulse 26.

The value of N is chosen so as to reduce the intensity of the jamming signal as viewed on the display device 16 to a point where the radar signal can be seen therethrough, as illustrated in FIG. 3(c) of the drawings. Since the outline of the jamming signal is more readily visible than the remainder of the signal, the two indications can be concurrently presented, and the operator of receiver 14 is not faced with the necessity of shutting off transmitter 18 in order to observe the enemy activity.

The value of N is a function of the power output of transmitter 18 as well as the persistence of the phosphor on the screen of the display device 16. It can be selected from a low of 2 to as high a figure as required to yield an acceptable display.

It is emphasized that the blanking pulses 26 must be precisely synchronized with the sweep variations 28. FIG. 2(*d*) gives an example of a sweep relationship which is unacceptable and will not produce the "look-thru" display of FIG. 3(*c*).

Obviously many modifications and variations of the present invention are possible in the light of the above teachings. It is therefore to be understood that within the scope of the appended claims the invention may be practiced otherwise than as specifically described.

I claim:

1. In a countermeasures system including an ECM receiver associated with a cathode-ray beam indicating device on the screen of which may be displayed a visual indication representative of the signal received from an enemy radar, and wherein a transmitter is employed to send out a jamming signal on a frequency essentially identical to that of such radar in order to confuse the enemy operator thereof, the improvement which comprises means for preventing the visual indication on said screen representative of such jamming signal from obscuring the visual indication representative of said radar signal, so as to enable the operator of said ECM receiver to monitor both such indications concurrently, said means including means for selectively interrupting the operation of said jamming signal transmitter synchronously with the deflection of the cathode-ray beam of said indicating device and in time coincidence therewith, said interrupting means operating during every Nth deflection of said beam, with N being equal to at least two.

2. The system of claim 1 in which said interrupting means includes a generator of blanking pulses.

3. The system of claim 2 in which the output of said blanking pulse generator is applied to said jamming transmitter through a logic circuit.

4. The system of claim 3 in which said logic circuit is programmed to pass therethrough only selected ones of the pulses received from said blanking pulse generator.

* * * * *